United States Patent
Mese et al.

(10) Patent No.: US 10,732,719 B2
(45) Date of Patent: Aug. 4, 2020

(54) PERFORMING ACTIONS RESPONSIVE TO HOVERING OVER AN INPUT SURFACE

(71) Applicant: Lenovo (Singapore) Pte. Ltd., Singapore (SG)

(72) Inventors: John C. Mese, Cary, NC (US); Arnold S. Weksler, Raleigh, NC (US); Nathan J. Peterson, Durham, NC (US); Russell S. VanBlon, Raleigh, NC (US)

(73) Assignee: Lenovo (Singapore) Pte. Ltd., Singapore (SG)

( * ) Notice: Subject to any disclaimer, the term of this patent is extended or adjusted under 35 U.S.C. 154(b) by 169 days.

(21) Appl. No.: 15/060,100

(22) Filed: Mar. 3, 2016

(65) Prior Publication Data

US 2017/0255318 A1  Sep. 7, 2017

(51) Int. Cl.
| | |
|---|---|
| *G06F 3/01* | (2006.01) |
| *G06F 3/0488* | (2013.01) |
| *G06F 3/0481* | (2013.01) |
| *G06F 3/041* | (2006.01) |
| *G06F 3/0354* | (2013.01) |

(52) U.S. Cl.
CPC ............ *G06F 3/017* (2013.01); *G06F 3/0416* (2013.01); *G06F 3/0488* (2013.01); *G06F 3/04817* (2013.01); *G06F 3/03545* (2013.01); *G06F 3/0412* (2013.01); *G06F 2203/04101* (2013.01)

(58) Field of Classification Search
CPC .... G06F 3/0416; G06F 3/044; G06F 3/03545; G06F 3/048; G06F 3/0488; G06F 2203/04101; G06F 3/0412; G06F 3/04817
See application file for complete search history.

(56) References Cited

U.S. PATENT DOCUMENTS

| | | | |
|---|---|---|---|
| 2006/0161870 A1* | 7/2006 | Hotelling | G06F 3/0485 715/863 |
| 2010/0245274 A1* | 9/2010 | Fukuda | G06F 3/04886 345/173 |
| 2011/0037712 A1* | 2/2011 | Kim | H04M 1/7253 345/173 |
| 2011/0164029 A1* | 7/2011 | King | G06T 19/00 345/419 |
| 2012/0120002 A1* | 5/2012 | Ota | G06F 3/044 345/173 |
| 2014/0152623 A1* | 6/2014 | Lee | G06F 3/03545 345/175 |
| 2014/0282269 A1* | 9/2014 | Strutt | G06F 3/04886 715/863 |
| 2016/0139697 A1* | 5/2016 | Lee | G06F 3/017 345/173 |
| 2016/0154519 A1* | 6/2016 | Joo | G06F 3/0488 345/156 |
| 2016/0370864 A1* | 12/2016 | Choi | G06F 3/0488 |

(Continued)

FOREIGN PATENT DOCUMENTS

| | | |
|---|---|---|
| CN | 102446060 | 5/2012 |
| CN | 103294258 | 9/2013 |

(Continued)

*Primary Examiner* — Darlene M Ritchie
(74) *Attorney, Agent, or Firm* — VanLeeuwen & VanLeeuwen; Jason A. Friday

(57) ABSTRACT

An approach is disclosed that detects an input instrument hovering a distance away from an object displayed on an input surface and performing an action in response to the detection.

20 Claims, 7 Drawing Sheets

(56) References Cited

U.S. PATENT DOCUMENTS

2017/0160914 A1* 6/2017 Niranjani ............ G06F 3/04845
2017/0195473 A1* 7/2017 Yun ................... H04M 1/72519

FOREIGN PATENT DOCUMENTS

| CN | 103631514 | 3/2014 |
| CN | 103914160 | 7/2014 |
| CN | 104285202 | 1/2015 |
| CN | 104298342 | 1/2015 |

* cited by examiner

PERFORMING ACTIONS RESPONSIVE TO HOVERING OVER AN INPUT SURFACE

BACKGROUND

A touchscreen is an input device normally layered on the top of an electronic visual display of an information handling system. A user can give input or control the information processing system through simple or multi-touch gestures by touching the screen with a special stylus/pen and-or one or more fingers. The user can use the touchscreen to react to what is displayed and to control how it is displayed; for example, zooming to increase the text size. The touchscreen enables the user to interact directly with what is displayed, rather than using a mouse, touchpad, or other input device.

Touchscreens are common in devices such as game consoles, personal computers, tablet computers, electronic voting machines, and smartphones. They can also be attached to computers or, as terminals, to networks. Touchscreens are also used in other types of information handling systems such as smart phones, personal digital assistants (PDAs), and electronic book readers.

The popularity of smartphones, tablets, and many types of information appliances is driving the demand and acceptance of common touchscreens for portable and functional electronics. Touchscreens are found in the medical field and in heavy industry, as well as for automated teller machines (ATMs), and kiosks such as museum displays or room automation, where other input devices do not allow a suitably intuitive, rapid, or accurate interaction by the user with the display's content.

Traditional touch screens require the user to touch the screen to perform an action which limits the number of actions that can be performed in response to information displayed.

SUMMARY

An approach is disclosed that detects an input instrument hovering a distance away from an object displayed on an input surface and performing an action in response to the detection.

The foregoing is a summary and thus contains, by necessity, simplifications, generalizations, and omissions of detail; consequently, those skilled in the art will appreciate that the summary is illustrative only and is not intended to be in any way limiting. Other aspects, inventive features, and advantages will become apparent in the non-limiting detailed description set forth below.

BRIEF DESCRIPTION OF THE DRAWINGS

This disclosure may be better understood by referencing the accompanying drawings, wherein.

DETAILED DESCRIPTION

Figure 1:
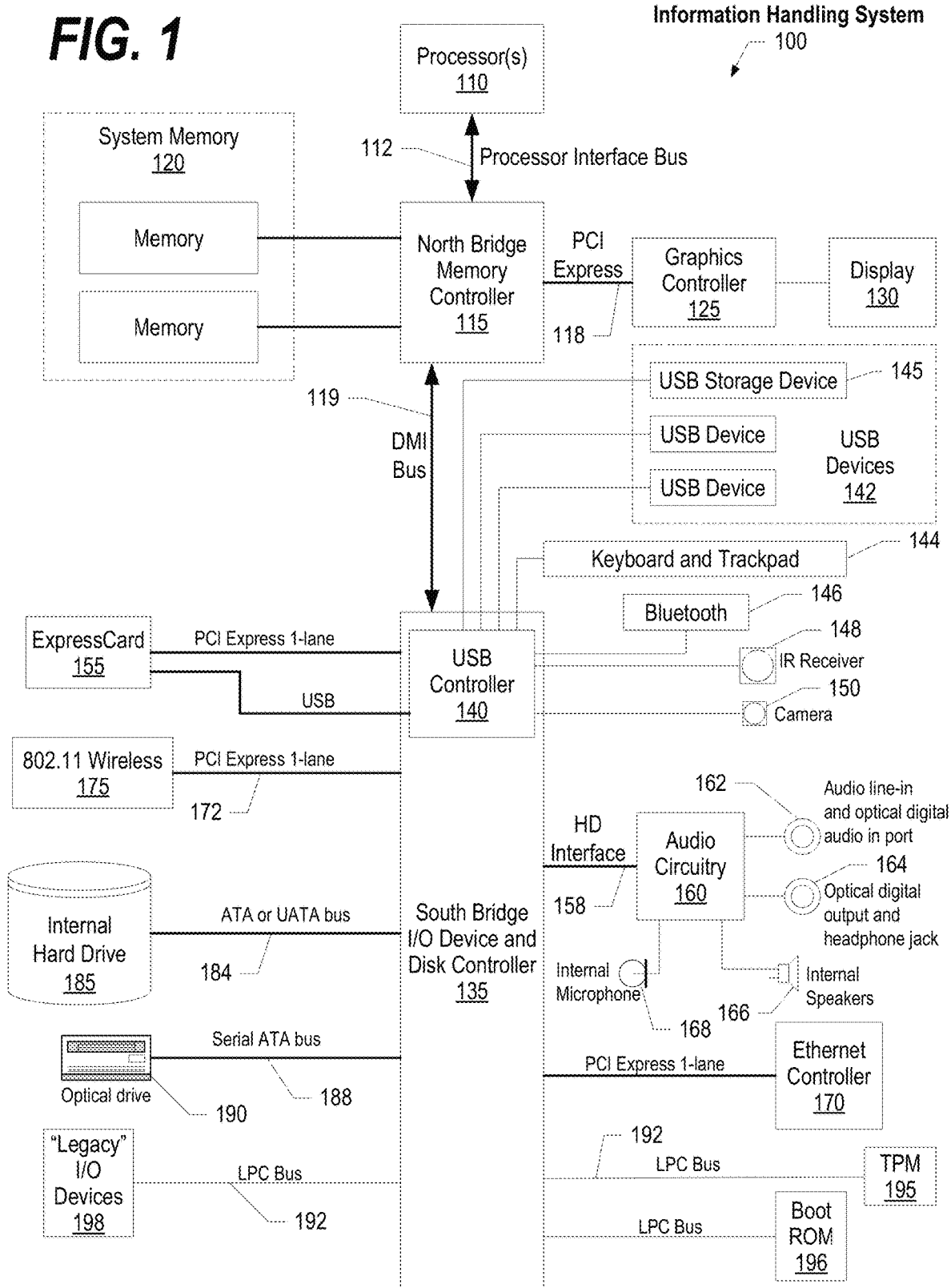
FIG. 1 is a block diagram of a data processing system in which the methods described herein can be implemented.

FIGS. 1-7 show an approach that provides a way to perform additional user-interface operations without navigating sub-menus or requiring input that is away from the current task. Air gestures can be used for navigating but does not combine depth and touch. The approach enables hover-touch by adding proximity detection over a display or keyboard. Using sensors such as proximity detectors or a camera, the system maintains a z-order value for detecting input. If a user hovers an input instrument, such as the user's finger or a stylus, above the screen, the user can perform an action that is different than an actual press/key/click of the screen location. The approach leverages depth and touch combinations. In one embodiment, the user varies the depth, or the distance that the user hovers from the screen surface, to enable different actions. For example, assume that the user has selected some text. If the user clicks again the cursor position would be moved and the selection would be reset. Using this approach, the user could hover to enable a context sensitive menu for an additional hover touch selection. For another example, assume that the user has a picture displayed on the screen. A hover that is close to the screen over the picture would zoom in fully, while a hover that is further away from the screen would zoom in a lesser amount.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The detailed description has been presented for purposes of illustration, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

As will be appreciated by one skilled in the art, aspects may be embodied as a system, method or computer program product. Accordingly, aspects may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device. As used herein, a computer readable storage medium does not include a computer readable signal medium.

Computer program code for carrying out operations for aspects of the present disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present disclosure are described below with reference to flowchart illustrations and/or block diagrams of methods, apparatus (systems) and computer program products. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The following detailed description will generally follow the summary, as set forth above, further explaining and expanding the definitions of the various aspects and embodiments as necessary. To this end, this detailed description first sets forth a computing environment in FIG. 1 that is suitable to implement the software and/or hardware techniques associated with the disclosure. A networked environment is illustrated in FIG. 2 as an extension of the basic computing environment, to emphasize that modern computing techniques can be performed across multiple discrete devices.

Figure 2:
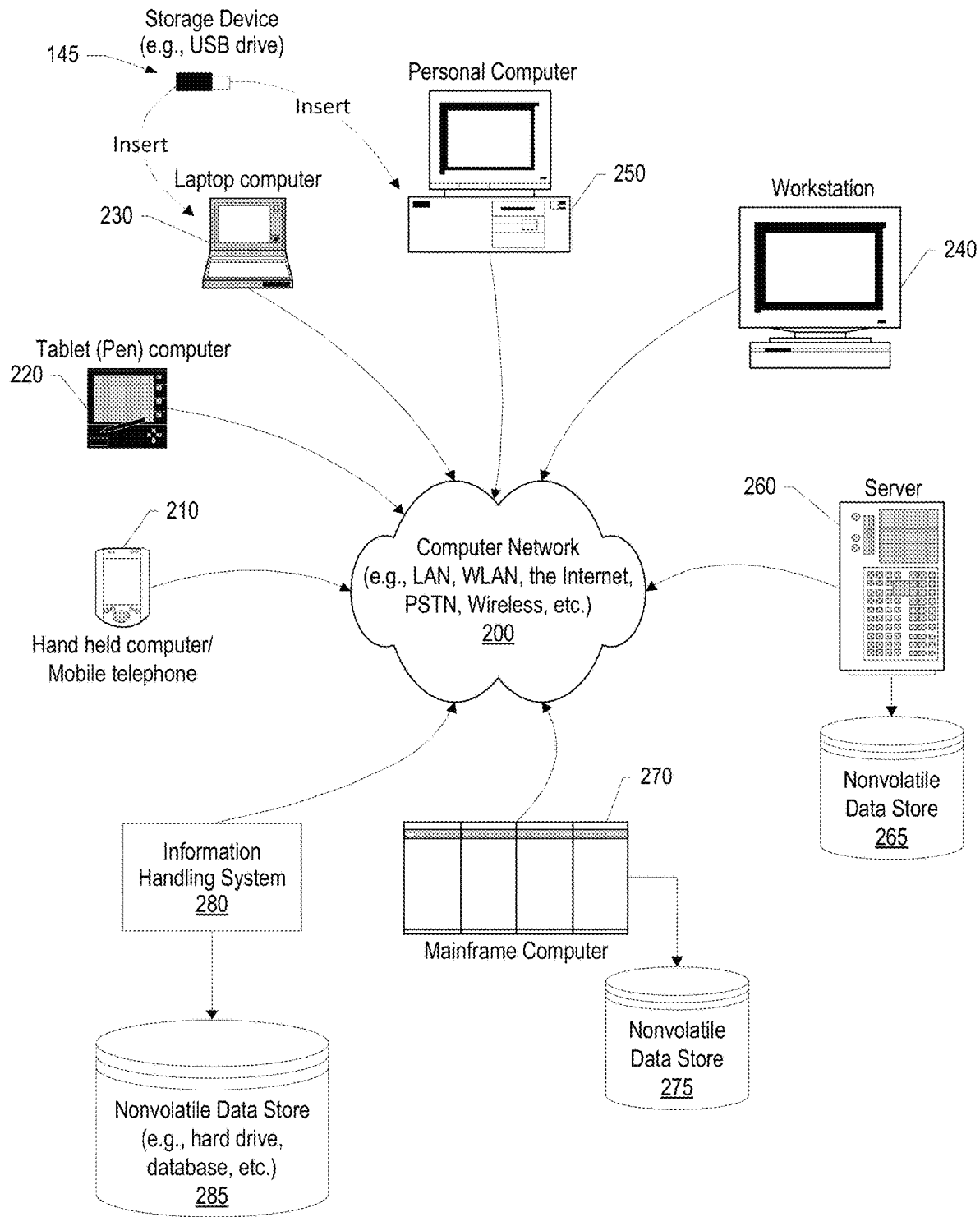
FIG. 2 provides an extension of the information handling system environment shown in FIG. 1 to illustrate that the methods described herein can be performed on a wide variety of information handling systems which operate in a networked environment.

FIG. 1 illustrates information handling system 100, which is a simplified example of a computer system capable of performing the computing operations described herein. Information handling system 100 includes one or more processors 110 coupled to processor interface bus 112. Processor interface bus 112 connects processors 110 to Northbridge 115, which is also known as the Memory Controller Hub (MCH). Northbridge 115 connects to system memory 120 and provides a means for processor(s) 110 to access the system memory. Graphics controller 125 also connects to Northbridge 115. In one embodiment, PCI Express bus 118 connects Northbridge 115 to graphics controller 125. Graphics controller 125 connects to display device 130, such as a computer monitor.

Northbridge 115 and Southbridge 135 connect to each other using bus 119. In one embodiment, the bus is a Direct Media Interface (DMI) bus that transfers data at high speeds in each direction between Northbridge 115 and Southbridge 135. In another embodiment, a Peripheral Component Interconnect (PCI) bus connects the Northbridge and the Southbridge. Southbridge 135, also known as the I/O Controller Hub (ICH) is a chip that generally implements capabilities that operate at slower speeds than the capabilities provided by the Northbridge. Southbridge 135 typically provides various busses used to connect various components. These busses include, for example, PCI and PCI Express busses, an ISA bus, a System Management Bus (SMBus or SMB), and/or a Low Pin Count (LPC) bus. The LPC bus often connects low-bandwidth devices, such as boot ROM 196 and "legacy" I/O devices (using a "super I/O" chip). The "legacy" I/O devices (198) can include, for example, serial and parallel ports, keyboard, mouse, and/or a floppy disk controller. The LPC bus also connects Southbridge 135 to Trusted Platform Module (TPM) 195. Other components often included in Southbridge 135 include a Direct Memory Access (DMA) controller, a Programmable Interrupt Controller (PIC), and a storage device controller, which connects Southbridge 135 to nonvolatile storage device 185, such as a hard disk drive, using bus 184.

ExpressCard 155 is a slot that connects hot-pluggable devices to the information handling system. ExpressCard 155 supports both PCI Express and USB connectivity as it connects to Southbridge 135 using both the Universal Serial Bus (USB) the PCI Express bus. Southbridge 135 includes USB Controller 140 that provides USB connectivity to devices that connect to the USB. These devices include webcam (camera) 150, infrared (IR) receiver 148, keyboard and trackpad 144, and Bluetooth device 146, which provides for wireless personal area networks (PANs). USB Controller 140 also provides USB connectivity to other miscellaneous USB connected devices 142, such as a mouse, removable nonvolatile storage device 145, modems, network cards, ISDN connectors, fax, printers, USB hubs, and many other types of USB connected devices. While removable nonvolatile storage device 145 is shown as a USB-connected device, removable nonvolatile storage device 145 could be connected using a different interface, such as a Firewire interface, etcetera.

Wireless Local Area Network (LAN) device 175 connects to Southbridge 135 via the PCI or PCI Express bus 172. LAN device 175 typically implements one of the IEEE 802.11 standards of over-the-air modulation techniques that all use the same protocol to wireless communicate between information handling system 100 and another computer system or device. Optical storage device 190 connects to Southbridge 135 using Serial ATA (SATA) bus 188. Serial ATA adapters and devices communicate over a high-speed serial link. The Serial ATA bus also connects Southbridge 135 to other forms of storage devices, such as hard disk drives. Audio circuitry 160, such as a sound card, connects to Southbridge 135 via bus 158. Audio circuitry 160 also provides functionality such as audio line-in and optical digital audio in port 162, optical digital output and headphone jack 164, internal speakers 166, and internal microphone 168. Ethernet controller 170 connects to Southbridge 135 using a bus, such as the PCI or PCI Express bus. Ethernet controller 170 connects information handling system 100 to a computer network, such as a Local Area Network (LAN), the Internet, and other public and private computer networks.

While FIG. 1 shows one information handling system, an information handling system may take many forms. For example, an information handling system may take the form of a desktop, server, portable, laptop, notebook, or other form factor computer or data processing system. In addition, an information handling system may take other form factors such as a personal digital assistant (PDA), a gaming device, ATM machine, a portable telephone device, a communication device or other devices that include a processor and memory.

The Trusted Platform Module (TPM 195) shown in FIG. 1 and described herein to provide security functions is but one example of a hardware security module (HSM). Therefore, the TPM described and claimed herein includes any type of HSM including, but not limited to, hardware security devices that conform to the Trusted Computing Groups (TCG) standard, and entitled "Trusted Platform Module (TPM) Specification Version 1.2." The TPM is a hardware security subsystem that may be incorporated into any number of information handling systems, such as those outlined in FIG. 2.

FIG. 2 provides an extension of the information handling system environment shown in FIG. 1 to illustrate that the methods described herein can be performed on a wide variety of information handling systems that operate in a networked environment. Types of information handling systems range from small handheld devices, such as handheld computer/mobile telephone 210 to large mainframe systems, such as mainframe computer 270. Examples of handheld computer 210 include personal digital assistants (PDAs), personal entertainment devices, such as MP3 players, portable televisions, and compact disc players. Other examples of information handling systems include pen, or tablet, computer 220, laptop, or notebook, computer 230, workstation 240, personal computer system 250, and server 260. Other types of information handling systems that are not individually shown in FIG. 2 are represented by information handling system 280. As shown, the various information handling systems can be networked together using computer network 200. Types of computer network that can be used to interconnect the various information handling systems include Local Area Networks (LANs), Wireless Local Area Networks (WLANs), the Internet, the Public Switched Telephone Network (PSTN), other wireless networks, and any other network topology that can be used to interconnect the information handling systems. Many of the information handling systems include nonvolatile data stores, such as hard drives and/or nonvolatile memory. Some of the information handling systems shown in FIG. 2 depicts separate nonvolatile data stores (server 260 utilizes nonvolatile data store 265, mainframe computer 270 utilizes nonvolatile data store 275, and information handling system 280 utilizes nonvolatile data store 285). The nonvolatile data store can be a component that is external to the various information handling systems or can be internal to one of the information handling systems. In addition, removable nonvolatile storage device 145 can be shared among two or more information handling systems using various techniques, such as connecting the removable nonvolatile storage device 145 to a USB port or other connector of the information handling systems.

Figure 3A:
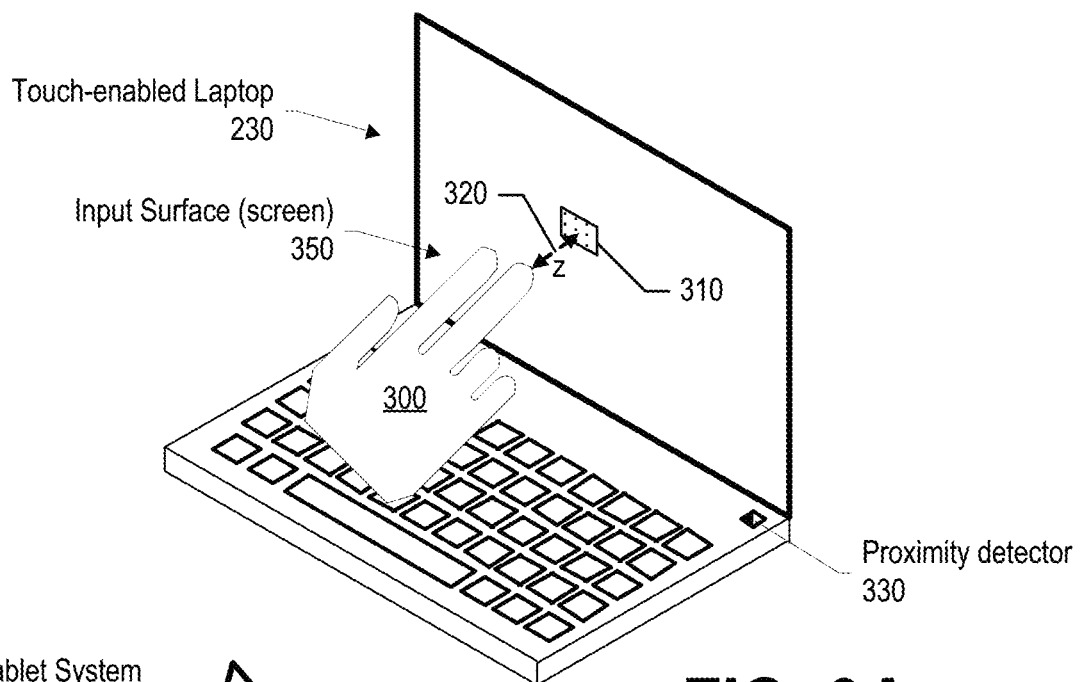
FIG. 3A is a component diagram depicting a user utilizing a hover touch interface with a touch-enabled laptop system.

FIG. 3A is a component diagram depicting a user utilizing a hover touch interface with a touch-enabled laptop system. Touch-enabled information handling system 230, such as a laptop computer system, has a touch-enabled display screen. The system includes one or more sensors, such as proximity detector sensor 330, that detect input instrument 300, such as a stylus or a human finger, that is hovering distance 320 away from the surface of the display screen. In FIG. 3A, the distance is depicted as "z." The input instrument is hovering over screen location 310, such as a graphical user interface (GUI) control or other object that is displayed on the screen. In the example shown, proximity detector sensor 330 is shown on the keyboard component of the information handling system, but such sensor could also be located elsewhere, such as on the display component of the system.

Figure 3B:
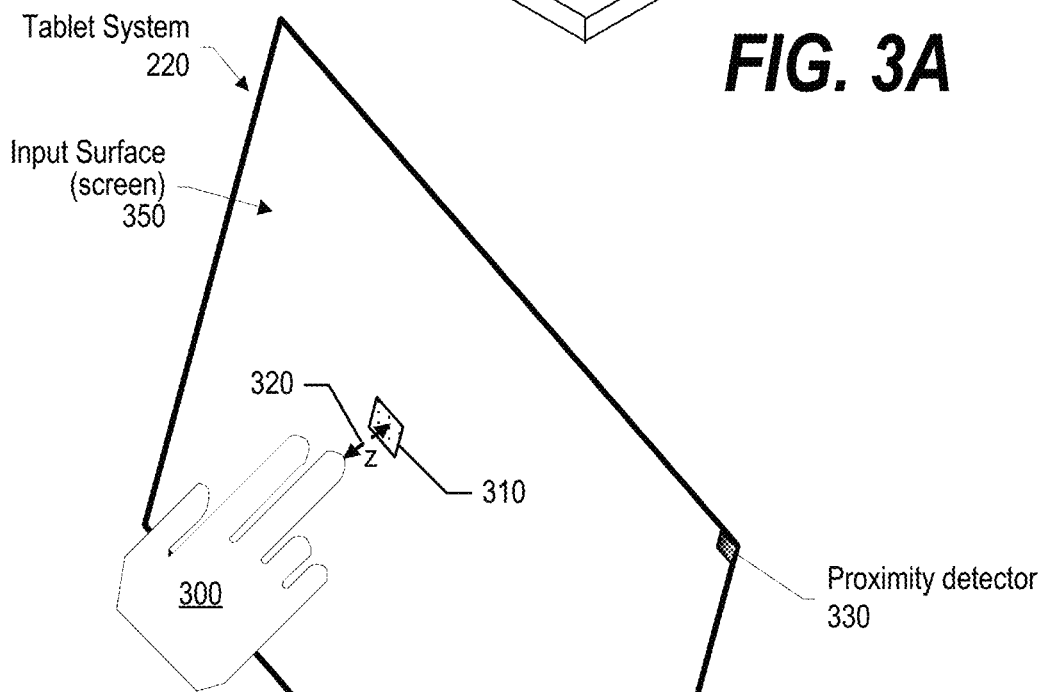
FIG. 3B is a component diagram depicting a user utilizing a hover touch interface with a touch-enabled tablet system.

Input surface 350 can be a touch-enabled display screen, touchpad surface, or a non-display surface that is capable of receiving touch inputs. In FIGS. 3A and 3B, input surface 350 is depicted as a touch-enabled display screen.

FIG. 3B is a component diagram depicting a user utilizing a hover touch interface with a touch-enabled tablet system. Touch-enabled information handling system 220, such as a tablet computer system, has a touch-enabled display screen. Similar to the system shown in FIG. 3A, this system also includes one or more sensors, such as proximity detector sensor 330, that detect input instrument 300, such as a stylus or a human finger, that is hovering distance 320 away from the surface of the display screen. In FIG. 3B, this distance away from the display screen is also depicted as "z." The input instrument is hovering over screen location 310, such as a graphical user interface (GUI) control or other object that is displayed on the screen. In the example shown, proximity detector sensor 330 is shown as being included in the display component of the system, such as on the edge of the tablet system.

Figure 4:
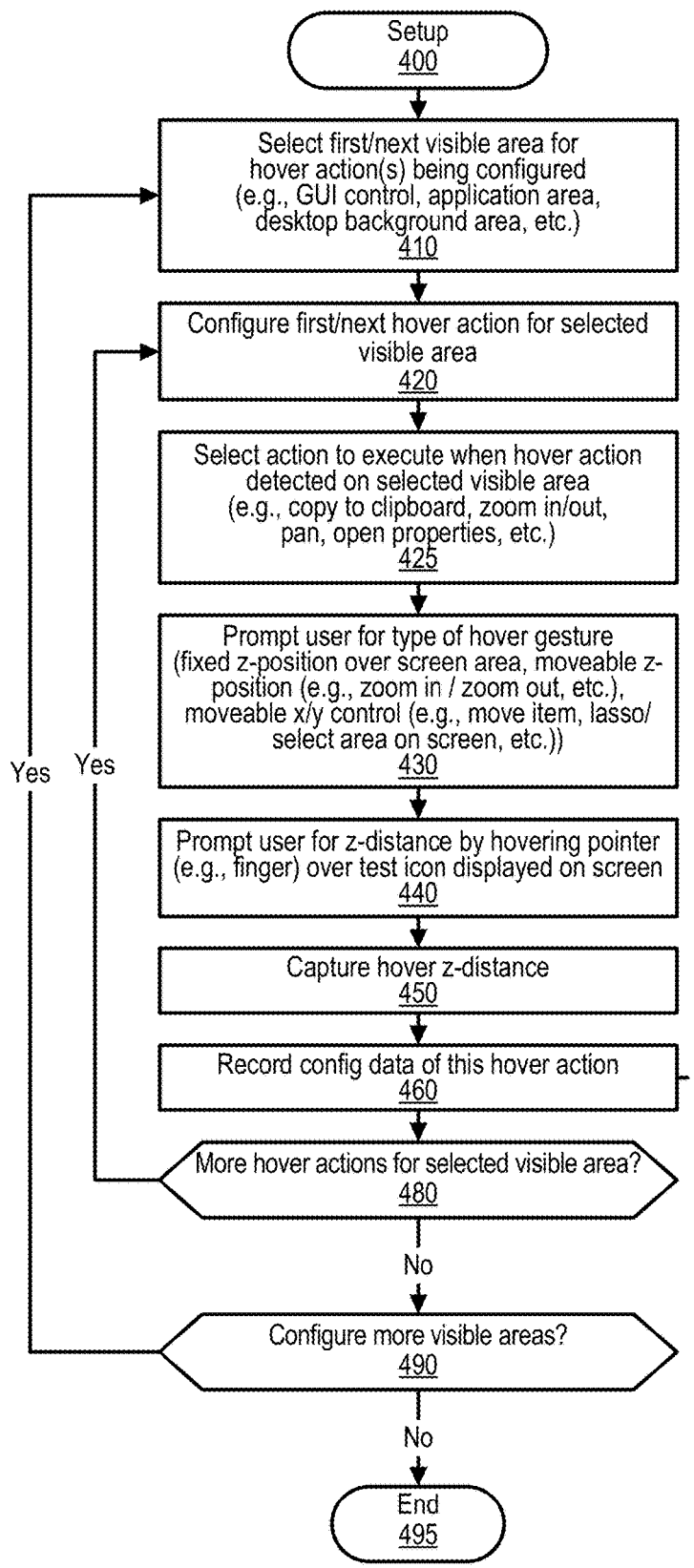
FIG. 4 is a flowchart depicting steps utilized in setting hover touch preferences at a system.
Figure 4:
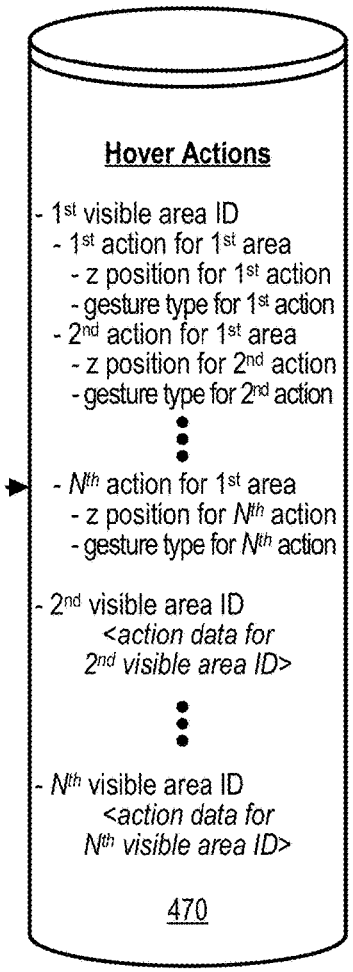

FIG. 4 is a flowchart depicting steps utilized in setting hover touch preferences at a system. FIG. 4 processing commences at 400 and shows the steps taken by a process that performs setup processing. At step 410, the process selects the first visible area for hover actions that are being configured by the user. The visible area might be a graphic user interface (GUI) control, an application area, a desktop background area, or the like. At step 420, the process configures the first hover action for selected visible area. In one embodiment, multiple actions can be configured for a screen location with the action that is performed being based on the distance that the input instrument is from the screen when the user is hovering over the screen location.

At step 425, the process selects an action to execute when the hover action is detected on the selected screen location. Actions might include copying the screen location to a clipboard, performing a zoom operation (e.g., zoom in/out based on input instrument movement to/from the screen), panning the display, opening a properties menu, etc.). At step 430, the process prompts user for the type of hover gesture that is being configured. Types of hover actions include a fixed z-position (distance) from the screen surface over a screen location, a moveable z-position, such as moving the input instrument towards or away from the screen surface to, for example, zoom in and zoom out, and a moveable x/y control to, for example, move an object displayed on the display screen or select an area defined by a "lasso" drawn by the user from a starting point to an ending point of the defined area.

At step 440, the process prompts the user for the z-distance by hovering the input instrument (e.g., finger, stylus, etc.) over a test icon displayed on screen. At step 450, the process captures z-distance that the user hovers the input instrument responsive to the prompt of step 440. At step 460, the process records the configuration data pertaining to this hover action in data store 470. Data store 470 includes various visible screen locations and hover actions pertaining to the various screen locations with the hover actions including the hover distances, the type of hovering, and the responsive actions performed.

The process determines as to whether the user wishes to configure more hover actions for the selected screen location (decision 480). If the user wishes to configure more hover actions for the selected screen location, then decision 480 branches to the 'yes' branch which loops back to step 420 to configure the next hover action for the selected screen area. This looping continues until the user does not wish to configure more hover actions for the selected screen location, at which point decision 480 branches to the 'no' branch exiting the loop.

The process determines as to whether the user wishes to configure more screen locations (decision 490). If the user wishes to configure more screen locations, then decision 490 branches to the 'yes' branch which loops back to step 410 to select the next screen location for hover actions. This looping continues until the user does not wish to configure more screen locations, at which point decision 490 branches to the 'no' branch exiting the loop. FIG. 4 processing thereafter ends at 495.

Figure 5:
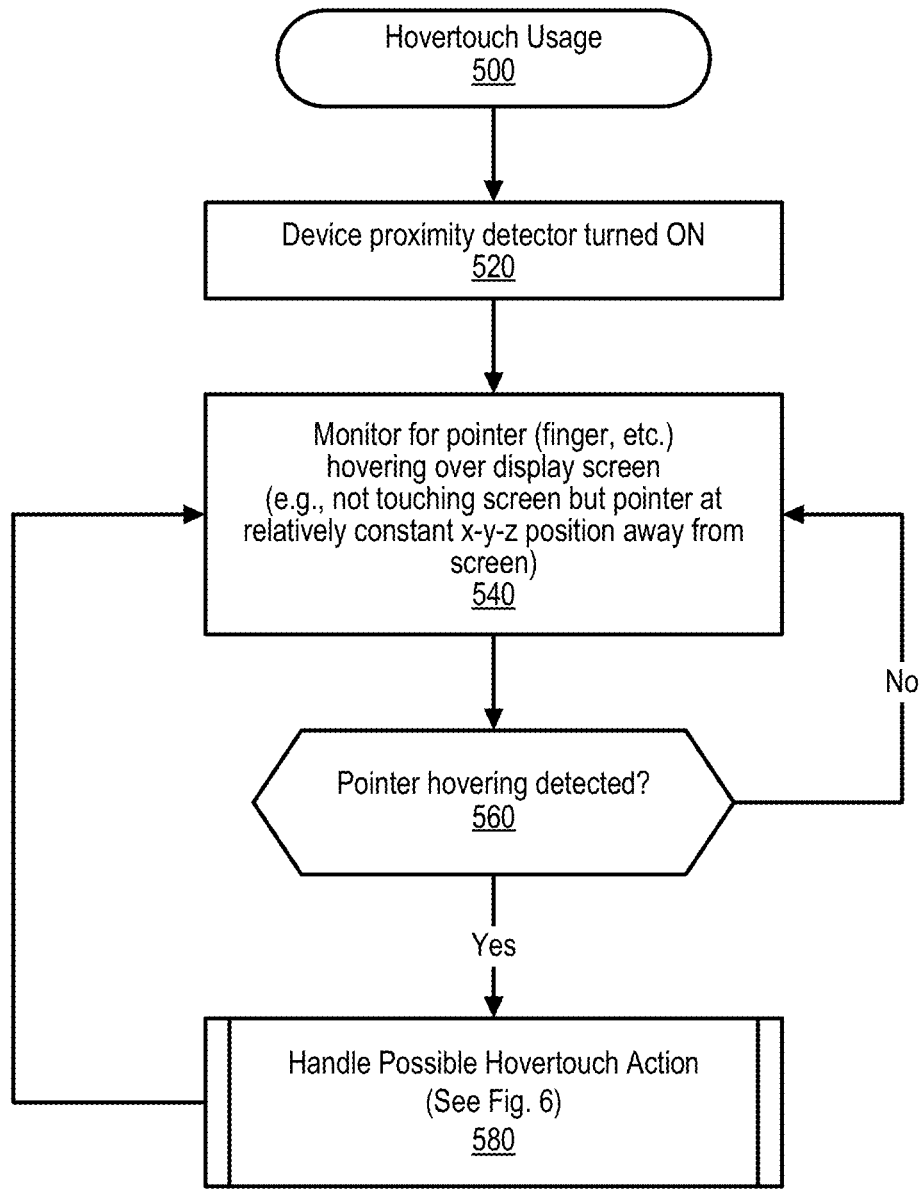
FIG. 5 is a flowchart showing high level steps implementing a hover touch interface.

FIG. 5 is a flowchart showing high level steps implementing a hover touch interface. FIG. 5 processing commences at 500 and shows the steps taken by a process that handles usage of hover actions by the user. At step 520, the process turns on the device's proximity detector. The device's proximity detector, or detectors, are one or more sensors that detect the input instrument hovering over an area of the display screen. At step 540, the process monitors for the input instrument (e.g., human finger, stylus, etc.) hovering over the display screen. A hover event is detected when the input instrument is not touching the display screen but is at a relatively constant x-y-z position distance away from the screen. More specifically, the input instrument is hovering at a z-distance away from the display screen over a screen location noted as x, y.

The process determines as to whether the display instrument is detected hovering over a screen location (decision 560). If the display instrument is detected hovering over a screen location, then decision 560 branches to the 'yes' branch to process the hover event using predefined process 580 which then loops back to step 540. If a hover event is not detected, then decision 560 bypassing predefined process 580 and loops back to step 540. When a hover event is detected then, at predefined process 580, the process performs the Handle Possible Hover Touch Action routine (see FIG. 6 and corresponding text for processing details). After the event is handled, processing loops back to step 540.

Figure 6:
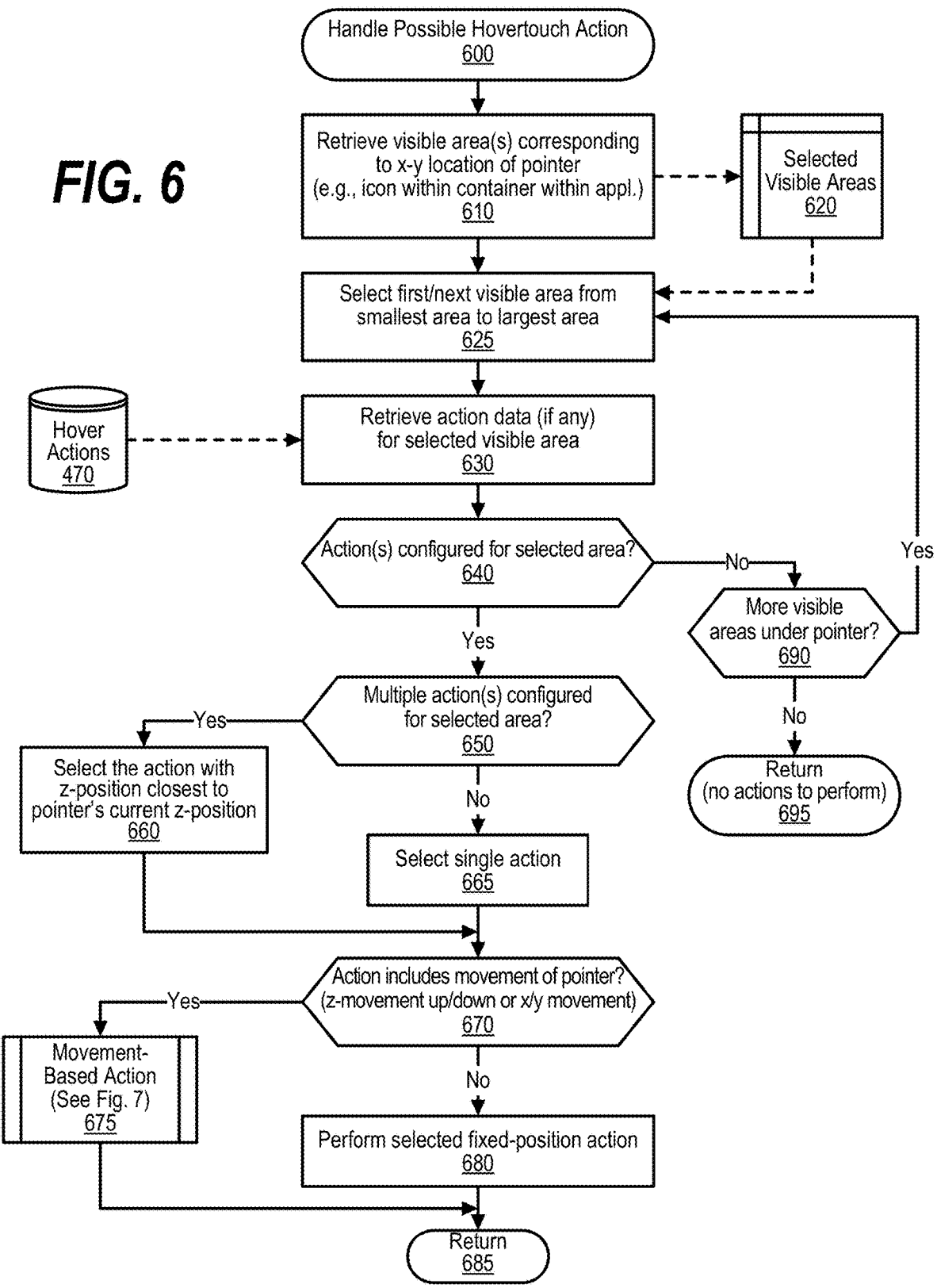
FIG. 6 is a flowchart depicting steps performed to handle a possible hover touch action.

FIG. 6 is a flowchart depicting steps performed to handle a possible hover touch action. FIG. 6 processing commences at 600 and shows the steps taken by a process that handles a possible hover event detected at the information handling system. At step 610, the process retrieves the visible area(s) corresponding to the x-y location over which the input instrument is hovering. For example, the hover event could be detected when the input instrument is hovering over an icon that is within a container that is within an application that is displayed on a desktop.

At step 625, the process selects the first visible area, or screen location, from the smallest area to the largest area. Using the example from above, the smallest area would be the icon and the largest area would be the desktop. At step 630, the process retrieves any hover action data that has been configured for the selected screen area. From the example above, step 630 might retrieve any hover action data pertaining first to the icon, then to the container, then to the application, and then to the desktop.

The process determines as to whether one or more hover actions have been configured for the selected screen location (decision 640). If one or more hover actions have been configured for the selected screen location, then decision 640 branches to the 'yes' branch to perform steps 650 through 685. On the other hand, if not action(s) configured for selected area, then decision 640 branches to the 'no' branch to perform steps 690 through 695.

If one or more hover actions have been configured for the selected screen location, then decision 640 branches to the 'yes' branch to perform steps 650 through 685. The process next determines whether multiple actions have been configured for the selected screen location (decision 650). If multiple actions have been configured for the selected screen location, then decision 650 branches to the 'yes' branch whereupon, at step 680, the process selects the hover action with a z-position that is closest to pointer's current z-position. In one embodiment, the selected action is within a distance range that includes the current distance that the input instrument is from the screen. On the other hand, if only one hover action has been configured for the selected screen location, then decision 650 branches to the 'no' branch whereupon, at step 665, the process selects the single hover action that was configured from the selected screen location.

The process determines as to whether the selected action includes movement of the input instrument (decision 670). If the selected action includes movement of the input instrument, then decision 670 branches to the 'yes' branch whereupon, at predefined process 675, the process performs the Movement-Based Action routine (see FIG. 7 and corresponding text for processing details). On the other hand, if the selected action does not include movement of the input instrument, then decision 670 branches to the 'no' branch whereupon, at step 680, the process performs the selected fixed-position action. FIG. 6 processing thereafter returns to the calling routine (see FIG. 5) at 685.

Returning to decision 640, if no actions were configured for the selected visible area, the process next determines whether there are more (larger) visible areas under the input instrument (decision 690). Using the example from above, if no actions were configured for the icon, then the process would determine if any actions were configured for the container, the application, and lastly the desktop. If there are more visible areas under the input instrument, then decision 690 branches to the 'yes' branch which loops back to step 625 to select the next larger screen area and determine whether actions are configured for the newly selected screen area. This looping continues until there are no more screen areas to select and process, at which point decision 690 branches to the 'no' branch exiting the loop and processing returns to the calling routine (see FIG. 6) at 695 without performing any actions.

Figure 7:
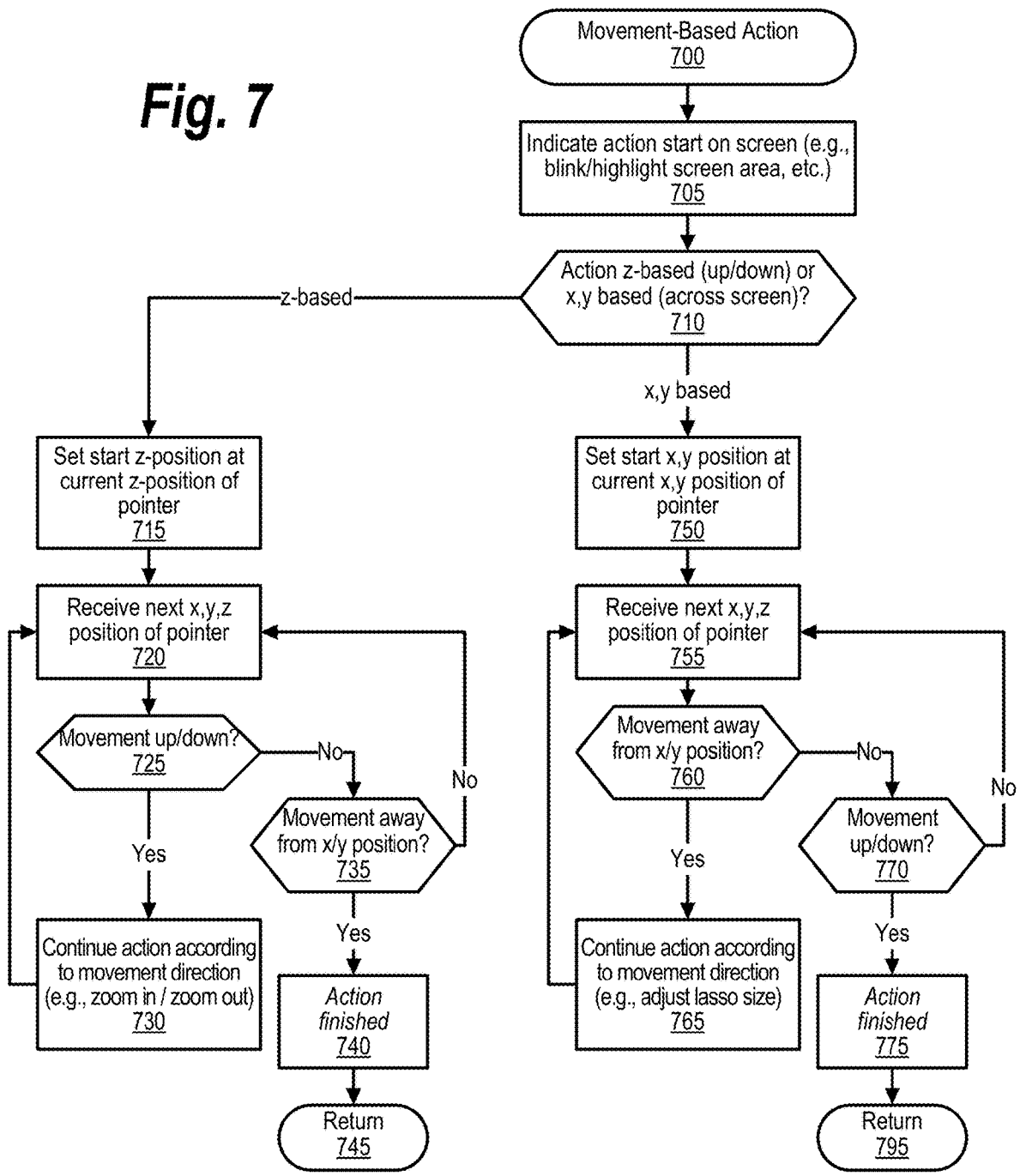
FIG. 7 is a flowchart showing further steps that handle a movement-based hover touch action.

FIG. 7 is a flowchart showing further steps that handle a movement-based hover touch action. FIG. 7 processing commences at 700 and shows the steps taken by a process that handles movement-based hover actions. At step 705, the process indicates the start of the movement-based action on the screen, such as by blinking or otherwise highlighting a screen area, etc.). At decision 710, the process determines as to whether the hover action is a z-based (up/down with input instrument moving closer or farther from the screen surface) hover action or an x,y based hover action (across the screen). If the hover action is a z-based (up/down) hover action, then decision 710 branches to the left (z-based) branch and decision 710 to perform steps 715 through 745. On the other hand, if the hover action is an x,y based hover action (across screen), then decision 710 branches to the downward (x,y based) branch to perform steps 750 through 795.

If the hover action is a z-based (up/down) hover action, then decision 710 branches to the left (z-based) branch from decision 710 to perform steps 715 through 745. At step 715, the process sets the starting z-position (distance) at the current z-position (distance) of the input instrument from the screen surface. At step 720, the process receives next x,y,z position of the input instrument. The process determines as to whether the input instrument has moved up or down changing the distance (z-position) from the surface of the screen (decision 725). If the input instrument has moved up or down, then decision 725 branches to the 'yes' branch whereupon, at step 730, the process continues the hover action according to the movement direction. For example, the hover action might be to zoom in as the input instrument is moved towards the screen surface and zoom out as the input instrument is moved away from the screen surface.

On the other hand, if the input instrument has not been moved up or down (away from or towards the surface of the screen), then decision 725 branches to the 'no' branch to perform decision 735. At decision 735, the process determines whether the input instrument has moved away from the original x/y position (decision 735). If the input instrument has moved away from the original x/y position, then decision 735 branches to the 'yes' branch whereupon, at step 740, the z-based hover action is finished and processing returns to the calling routine (see FIG. 6) at 745. On the other hand, if the input instrument has not moved away from the original x/y position, then decision 735 branches to the 'no' branch whereupon processing continues to loop back to step 720 to receive the next x,y,z position of the input instrument relative to the screen surface.

Returning to decision 710, if the hover action is an x,y based hover action (across the screen), then decision 710 branches to the downward (x,y based) branch to perform steps 750 through 795. At step 750, the process sets the starting x,y position at the current x,y position of the input instrument. At step 755, the process receives the next x,y,z position of the input instrument. The process next determines whether the input instrument is moving to a different x/y position over the display screen with the z-position remaining relatively constant (decision 760). If the input instrument is moving to a different x/y position over the display screen, then decision 760 branches to the 'yes' branch whereupon, at step 765, the process continues the hover action according to movement direction of the input instrument. For example, if the user is selecting an area on the screen, the x/y position change might adjust the size of a "lasso" that is being drawn on the screen.

On the other hand, if the input instrument is not moving to a different x/y position over the display screen, then decision 760 branches to the 'no' branch to perform decision 770. At decision 770, the process determines whether the input instrument is moving up/down, or towards/away from the display screen (decision 770). If the input instrument is moving up/down, then decision 770 branches to the 'yes' branch, whereupon, at step 775, the x/y-based hover action is finished and processing returns to the calling routine (see FIG. 6) at 795. On the other hand, if the input instrument is not moving up/down, then decision 770 branches to the 'no' branch whereupon processing continues to loop back to step 755 to receive the next x,y,z position of the input instrument relative to the screen surface.

While particular embodiments have been shown and described, it will be obvious to those skilled in the art that, based upon the teachings herein, that changes and modifications may be made without departing from this invention and its broader aspects. Therefore, the appended claims are to encompass within their scope all such changes and modifications as are within the true spirit and scope of this invention. Furthermore, it is to be understood that the invention is solely defined by the appended claims. It will be understood by those with skill in the art that if a specific number of an introduced claim element is intended, such intent will be explicitly recited in the claim, and in the absence of such recitation no such limitation is present. For non-limiting example, as an aid to understanding, the following appended claims contain usage of the introductory phrases "at least one" and "one or more" to introduce claim elements. However, the use of such phrases should not be construed to imply that the introduction of a claim element by the indefinite articles "a" or "an" limits any particular claim containing such introduced claim element to inventions containing only one such element, even when the same claim includes the introductory phrases "one or more" or "at least one" and indefinite articles such as "a" or "an"; the same holds true for the use in the claims of definite articles.

What is claimed is:

1. A method comprising:
    detecting an input instrument hovering a distance (z) over a first surface location (x, y) of an input surface;
    retrieving a first set of one or more actions from a plurality of actions, wherein each of the plurality of actions is associated with a respective surface area of the screen and a respective distance (z), and wherein each of the first set of actions are associated with the respective surface area that includes the first surface location;
    selecting a first action from the first set of actions based on the distance (z) of the input instrument over the input surface; and
    performing the selected first action, wherein, if no actions are configured for the respective surface area, determining whether there are one or more larger visible surface areas under the input instrument and selecting the first action pertaining to one of the larger visible surface areas that also corresponds to the distance (z).

2. The method of claim 1 wherein the input instrument is selected from a group consisting of a human finger and a stylus.

3. The method of claim 1 further comprising:
    performing the action on an object displayed at the first surface location.

4. The method of claim 1 further comprising:
    detecting a movement of the hovering input instrument to a second surface location, wherein the first and second surface locations define a the surface area.

5. The method of claim 1 wherein the detecting further detects a length of the distance, and wherein the method further comprises:
    detecting a movement of the hovering input instrument over the first surface location, wherein the movement changes the length of the distance that the input instrument is hovering over the first surface location, wherein the action that is performed is based on the change of the length.

6. The method of claim 1 further comprising:
    detecting that the input instrument is hovering the distance (z) over a second location (x',y') of the input surface;
    retrieving a second set of one or more actions from the plurality of actions, wherein each of the second set of actions are associated with surface areas that include the second surface location, wherein the second set of actions are different from the first set of actions;
    selecting a second action from the second set of actions based on the distance (z) of the input instrument over the input surface; and
    performing the second action, wherein the second action is different from the first action.

7. The method of claim 1 wherein the selection of the first action is based on the respective distance (z) closest to the input instrument's current z-position.

8. An information handling system comprising:
    one or more processors;
    a memory coupled to at least one of the processors;
    a touch-enabled display accessible by at least one of the processors, wherein the touch-enabled display has an input surface;
    one or more sensors accessible by at least one of the processors that sense an input instrument hovering over the touch-enabled display; and
    a set of instructions stored in the memory and executed by at least one of the processors to:
        detect, based on data received from the sensors, that the input instrument is hovering a distance (z) over a first surface location (x, y) of the input surface;
        retrieve a first set of one or more actions from a plurality of actions, wherein each of the plurality of actions is associated with a respective surface area of the screen and a respective distance (z), and wherein each of the first set of actions is associated with the respective surface area that includes the first surface location;
        select a first action from the first set of actions to based on the distance (z) of the input instrument over the input surface; and
        perform the selected first action, wherein, if no actions are configured for the respective surface area, determininq whether there are one or more larger visible surface areas under the input instrument and selecting the first action pertaining to one of the larger visible surface areas that also corresponds to the distance (z).

9. The information handling system of claim 8 wherein the input instrument is selected from a group consisting of a human finger and a stylus.

10. The information handling system of claim 8 wherein the system comprises further instructions performed by the processors to:
    perform the action on an object displayed at the first surface location.

11. The method of claim 8 wherein the system comprises further instructions performed by the processors to:
    detect a movement of the hovering input instrument to a second surface location, wherein the first and second input surface locations define a the surface area.

12. The information handling system of claim 8 wherein the system comprises further instructions performed by the processors to:
    detect a length of the distance;
    detect a movement of the hovering input instrument over the first surface location, wherein the movement changes the length of the distance that the input instrument is hovering over the first surface location, wherein the action that is performed is based on the change of the length.

13. The information handling system of claim 8 wherein the system comprises further instructions performed by the processors to:
    detect that the input instrument is hovering the distance (z) over a second location (x',y') of the input surface;
    retrieve a second set of one or more actions from the plurality of actions, wherein each of the second set of actions are associated with surface areas that include the second surface location, wherein the second set of actions are different from the first set of actions;
    select a second action from the second set of actions based on the distance (z) of the input instrument over the input surface; and
    perform the second action, wherein the second action is different from the first action.

14. The information handling system of claim 8 wherein the selection of the first action is based on the respective distance (z) closest to the input instrument's current z-position.

15. A computer program product comprising:
    a computer readable storage medium comprising a set of computer instructions, the computer instructions effective to:

detect that an input instrument is hovering a distance (z) over a first surface location (x, y) of an input surface;

retrieve a first set of one or more actions from a plurality of actions, wherein each of the plurality of actions is associated with a respective surface area of the screen and a respective distance (z), and wherein each of the first set of actions are associated with the respective surface area that includes the first surface location;

select a first action from the first set of actions based on the distance (z) of the input instrument over the input surface; and perform the selected first action, wherein, if no actions are configured for the respective surface area, determining whether there are one or more larger visible surface areas under the input instrument and selecting the first action pertaining to one of the larger visible surface areas that also corresponds to the distance (z).

16. The computer program product of claim 15 wherein the input instrument is selected from a group consisting of a human finger and a stylus.

17. The computer program product of claim 15 wherein the computer instructions are further effective to:

performing the action on an object displayed at the first surface location.

18. The method of claim 15 wherein the computer instructions are further effective to:

a movement of the hovering input instrument to a second surface location, wherein the first and second surface locations define the surface area.

19. The computer program product of claim 15 wherein the computer instructions are further effective to:

detect a length of the distance; and detect a movement of the hovering input instrument over the first surface location, wherein the movement changes the length of the distance that the input instrument is hovering over the first surface location, wherein the action that is performed is based on the change of the length.

20. The computer program product of claim 15 wherein the computer instructions are further effective to:

detect that the input instrument is hovering the distance (z) over a second location (x',y') of the input surface;

retrieve a second set of one or more actions from the plurality of actions, wherein each of the second set of actions are associated with surface areas that include the second surface location, wherein the second set of actions are different from the first set of actions;

select a second action from the second set of actions based on the distance (z) of the input instrument over the input surface; and perform the second action, wherein the second action is different from the first action.

* * * * *